United States Patent Office 2,700,605
Patented Jan. 25, 1955

2,700,605
PROCESS FOR MAKING A FLUID PHOSPHATE FERTILIZER SLURRY SUITABLE FOR PELLETIZING

Floyd B. Hornibrook, Piedmont, Calif., assignor to Best Fertilizers Co., Oakland, Calif., a corporation of California No Drawing. Application November 10, 1951,
Serial No. 255,878

2 Claims. (Cl. 71—40)

This invention relates generally to the manufacture of phosphate fertilizer, and more specifically to the steps of producing a slurry for pelletizing.

In what will hereinafter be referred to as the "slurry process" of producing phosphate fertilizer, it has heretofore been the practice to use phosphoric acid, or a mixture of phosphoric and sulfuric acids and ammonia as starting materials. These are reacted together in solution with the water content held at a minimum, and the completed slurry will remain fluid, while hot, at a water content as low as 18% to 20% by weight. The hot fluid slurry is then pumped or flowed by gravity to a mixer where fines of the sames composition as the slurry are added and become coated with the slurry. The coated fines then go to a drier and are then screened for size and oversized pellets are ground up and are returned to the mixer together with the undersized particles.

The process is a more direct manufacturing one than other conventional pelletizing processes in which the chemically processed fertilizer materials are dampened to contain about 14% to 18% water, and are then pelletized in a rotating drum and finally dried. However the present slurry process requires the making of the phosphoric acid by a separate and unrelated process that is expensive and cumbersome. The customary superphosphate process requires weeks of storage of the green superphosphate to complete the $P_2O_5$ conversion to an economic level.

The slurry process, as heretofore practiced, is not suitable for utilizing raw phosphate rock, instead of phosphoric acid, in the manufacture of pelletized phosphate fertilizer due to the high water content (40% to 60% by weight) to maintain the slurry sufficiently fluid for handling as a pumpable slurry. The cost of drying, where this amount of water is present is too expensive to be economically feasible. The higher water requirement is believed due to a number of causes, one being the rapid transition of the calcium sulfate to gypsum at any time during the digestion, and at which time the entire batch may set up solid unless a very large amount of water is added within the period of a few minutes. Another reason is the presence of acid soluble silicates, which, under certain conditions take on many times their own weight of water, forming silicious gel.

To illustrate the high water content required to digest raw phosphate rock in a slurry process two examples are cited:

Example 1.—Acid-rock ratio characteristic of superphosphate manufacture:

|  | Parts |
|---|---|
| Ground phosphate rock | 100 |
| Sulfuric acid, 100% basis | 60 |
| Water | 160 |

The water content of this mix is 50% by weight of the total, yet within five minutes after combining the rock acid and water, the batch becomes thick and pasty and can no longer be handled as a slurry. Only when sufficient water is added to bring the water content to 62% by weight does the mix thin out sufficiently to permit stirring and pumping as a slurry.

Example 2.—High acid rock ratio, such as would provide after final neutralization with ammonia, a product with relatively high nitrogen content:

|  | Parts |
|---|---|
| Ground phosphate rock | 100 |
| Sulfuric acid, 100% basis | 160 |
| Water | 260 |

This mixture is nicely fluid at this water content (50% by weight at the time of mixing) but gradually thickens so that at the end of 20 minutes additional water has to be added to maintain fluidity. After one-half hour digestion of the rock, anhydrous ammonia is added to neutralize the free acids and additional water also has to be added. The final neutralized mix requires a water content of 59% to maintain the mix sufficiently fluid to handle as a slurry.

Irrespective of the reasons for the high water requirement, said requirement exists and has been the principal obstacle to what would normally appear to be a simple and economically satisfactory process.

It has been discovered, however, that by the proper addition of inorganic salts to the digestion mixture prior to the addition of the raw phosphate rock, it is possible to digest phosphate rock by the slurry process, and to simultaneously add nitrogen and potash, and end up the digestion phase with a fluid slurry having water content as low as 25%, and which will remain fluid almost indefinitely, if agitated, with the water content as low as 28%. This enables the pelletizing of the slurry by the slurry process while holding the drying cost within an economic range.

An object of the invention is to provide a slurry process, suitable for use in pelletizing the finished material, using phosphate rock, sulfuric acid, inorganic salts and ammonia as the starting materials, and ending the chemical processing stage with a slurry which is fluid at water contents as low as 28%.

Another object of the invention is to provide a slurry process, suitable for use in pelletizing in which the period of acid digestion of the phosphate rock can be limited to less than one hour, yet obtaining 96% or better conversion of the $P_2O_5$ to the available form.

An additional object of the invention is to provide a slurry process for use in pelletizing to which potash salts or other inorganic salts can be added without causing the slurry to thicken or to set, even though the water content of the slurry is as low as 28%.

Another object is to provide a slurry process suitable for use in pelletizing in which the slurry of low water content is furnished at a temperature of about 210° F. or higher to the pelletizing state, thus effecting a saving in drying heat requirements.

Other objects and advantages will be found in the description.

The present invention comprises the addition or inclusion of certain amounts of inorganic salts in the sulfuric acid-water digestion solution, and by reason of which inclusion, the factors which would otherwise cause the thickening or setting action are so inhibited that a slurry is obtained after digestion and final ammoniation that will remain fluid indefinitely, when agitated, at a water content as low as 28% by weight. It has been discovered that the amount of inorganic salt required to prevent thickening is a function of the acid concentration. Accordingly, by addition of the proper amount of inorganic salts, the acid concentration can be varied over a considerable range, thereby varying the analysis over a considerable range, and also controlling the digestion rate. If very rapid digestion is desired, a stronger acid concentration can be used, providing the proper amount of inorganic salt is added.

The following table, designated Table A, gives test results showing the amount of inorganic salt required to maintain the slurry fluid when the acid concentration is varied over the preferred range. Ammonium sulfate was selected as the inorganic salt to be added. In each instance the ground phosphate rock was added to the hot sulfuric acid water ammonium sulfate solution and digestion of the rock, with agitation continued for one hour which was long enough to give 95% or better conversion of the $P_2O_5$ to the available form. Anhydrous ammonia was then added until the free acids were approximately neutralized. Potash salts were added to each mix to give approximately 5% $K_2O$ in the final composition. Col. 1 gives the acid concentrations percent by weight in the digestion mix just prior to the addition of the rock. Column 2 gives the acid concentration expressed as degrees Baumé based on the acid and water only. Column 3 gives the ammonium sulfate concentration percent by weight in the digestion mix just prior to the rock addition, at which a thickening or setting actually occurred during the digestion or final ammoniation, thus requiring the addition of an excess of water to maintain fluidity. At any lesser amount of ammonium sulfate than that given in column 3 thickening or setting will also occur. Column 4 gives the lowest concentration of ammonium sulfate at which the slurry remained fluid not only during the processing but indefinitely afterwards at water contents of 28% or lower so long as agitation was continued and water lost by evaporation was replaced. Concentrations of ammonium sulfate higher than that given in column 4 (for any given acid concentration) will also produce a fluid slurry. The ammonium sulfate concentration intermediate between those in column 3 and column 4 represent the transition zone between actual setting mixes (excessively high water requirements) and mixes which will remain fluid at low water contents. Column 5 gives the approximate composition, dry basis, of the end product.

Table A

| Col. 1 | Col. 2 | Col. 3 | Col. 4 | Col. 5 |
| --- | --- | --- | --- | --- |
| Acid conc., percent by wt. of acid plus water | Acid conc., acid plus water, Deg. Baumé | Ammo. sulfate conc. at which thickening occurred, percent by wt. of mix | Ammo. sulfate conc. at which mix remained fluid, percent by wt. of mix | Approx. composition of mix in Col. 4, dry basis; N-$P_2O_5$-$K_2O$ |
| 22 | 19.8 | 18 | 22 | 10.3–10.0–4.7 |
| 24 | 21.5 | 12 | 14 | 8.9–11.3–5.3 |
| 26 | 23.7 | 10 | 12 | 8.7–11.5–5.4 |
| 28 | 24.8 | 6 | 8 | 8.6–11.6–5.5 |
| 30 | 26.4 | 10 | 12 | 10.2–10.1–4.7 |
| 32 | 28.0 | 12 | 14 | 11.6– 8.6–4.1 |

As can be seen from the table, at the lower acid concentration the ammonium sulfate demand is relatively high. As the acid concentration is increased the ammonium sulfate demand decreases until a minimum is reached at approximately 28% acid. The ammonium sulfate requirement then increases. As shown in col. 5 the composition can be varied over a considerable range of $P_2O_5$ depending on the strength of acid in the digestion mix. Of course, the nitrogen can be increased at any time by increasing the amount of ammonium sulfate above the required minimum. If no potash salts are added either the $P_2O_5$ or the nitrogen contents or both can be increased. Compositions have been successfully prepared ranging from 18% nitrogen and 4% $P_2O_5$ to 7% nitrogen and 15% $P_2O_5$, dry basis. Acid concentrations ranging from 18° Bé. to 35° Bé. have been successfully employed by using an adequate amount of inorganic salt to insure final fluidity, the amounts of inorganic salt used ranging from 8 to 45%. Some factors that will change the ammonium sulfate demand for any given acid concentration are:

(1) *Phosphate rock composition.*—This factor is unpredictable and must be determined for each type of rock. The general relationship illustrated in Table A however, has been found to apply to phosphate rock obtained from all major producing areas in the U. S.

(2) *Addition of potash salts to the mix.*—If no potash salts (muriate, sulfate or nitrate of potash) are added the ammonium sulfate demand is decreased as much as 4 percentage points for those mixes having high ammonium sulfate demand, and decreased as much as 2 percentage points for mixes with low ammonium sulfate demand.

(3) *Time and temperature of digestion.*—Both time and temperature of digestion exert a minor effect on the ammonium sulfate demand. In general, lower digestion temperature and shorter digestion time decrease the ammonium sulfate demand. Since for a given degree of $P_2O_5$ conversion a lower digestion temperature requires a longer digestion time these factors tend to balance each other.

Insofar as this invention is concerned, it is not material whether the ammonium sulfate is added as a crystalline material, or whether, as part of the reaction, sulfuric acid and ammonia are combined in aqueous solution, stopping the ammoniation at such a point as to leave the desired amount of uncombined acid as is needed to react with the rock.

The process may be conducted in batches or as a continuous process, so long as the amount of ammonium sulfate is present as is required by the uncombined sulfuric acid concentration at any given time.

Although in Table A and in the foregoing descriptions and generalizations based on Table A ammonium sulfate has been referred to as the inorganic salt capable of producing the desired fluid slurry at low water contents, the claim is not limited to this salt. It has been found that ammonium nitrate and ammonium phosphate, if added in amounts to give substantially the same ammonium concentration as provided by ammonium sulfate, are just as effective as ammonium sulfate. Similarly potassium sulfate or potassium nitrate if added in an amount to give substantially the same anion concentration as provided by the required amount of ammonium sulfate is just as effective as ammonium sulfate. These examples are cited to illustrate the principle but the claims are not limited to these salts. Insofar as I am aware the inorganic salts may be any of the sulfates, nitrates and phosphates of ammonia and potash and are preferably those having the desired fertilizer characteristics or value.

It appears that the presence of the inorganic salt during the phosphate rock conversion state causes the formation of a metastable solution of the complex salts which results in the slurry remaining fluid at such low water contents. If, on the other hand, pure chemicals are combined in the amounts to reproduce the analysis of the slurry process, the water demand is high. For example, ammonium sulfate, mono-ammonium phosphate, gypsum and muriate of potash, when mixed in amounts to produce a composition of 11% N., 8% $P_2O_5$; and 4% $K_2O$ with the calcium content from the gypsum the same as results from a 11–8–4 composition made by the slurry process for digestion of phosphate rock, the water requirement is 46% to produce a slurry sufficiently fluid to flow by gravity.

An example of a commercially produced fertilizer in a plant that has produced over 10,000 tons of pelletized product having a guaranteed composition of 11% nitrogen, 8% $P_2O_5$ and 4% $K_2O$ clearly illustrates the process and its advantages.

About 2200 gallons of water, 350 gallons of concentrated sulfuric acid and sufficient anhydrous ammonia to neutralize the acid are introduced into a batch tank that is lined with acid proof brick and that is provided with a suitable agitator. This amount of water is selected to give a water content of 28% to 30% in the slurry at the time it is delivered to the pelletizing stage, and the amount of acid is the amount which, when neutralized with the ammonia will provide sufficient ammonium sulfate to insure a fluid, pumpable, gravity flowable slurry having a water content of only 28% to 30% by weight.

The reaction between the sulfuric acid and the ammonia in forming the ammonium sulfate generates a large amount of heat which is dissipated by boiling off water that is discharged as steam.

After neutralization of the 350 gallons of acid, an additional 400 gallons of concentrated sulfuric acid is added. This results in the generation of a large amount of heat and the boiling off of more water.

Substantially 6000 lbs. of finely ground phosphate rock is added next, and the agitator keeps the mixture well agitated. The heat of reaction between the phosphate rock and the acid is such that the digestion mixture is maintained near the boiling point (215° F. to 225° F.). At this temperature, and with excess of acid present, digestion of the rock proceeds so rapidly that as soon as the addition of phosphate rock is completed the final neutralization with ammonia is started. The final ammoniation neutralizes any excess sulfuric acid present and also neutralizes the phosphoric acid formed as a part of the chemical reaction, and uniform agitation is continued.

This final reaction also generates considerable heat so that more water is boiled off.

When the batch is nearly neutralized, sufficient potash salts as muriate or sulfate of potash are added to provide the 4% $K_2O$ by weight in the final product.

At this point the hot mixture, containing approximately ten tons of chemically processed fertilizer is ready for the pelletizing step, and as conducted in a batch-wise basis, the total time required for the processing of a batch and delivering it to the pelletizing stage is approximately four hours. The water content, by weight, being in the range of 28% to 32% with an average of 30%.

As already pointed out, this process makes it possible to deliver a pumpable, gravity flowable fluid slurry to the pelletizing stage having solids content as high as 72% without a pre-drying step.

The digestion is conducted at the natural boiling point of the reaction mixture, thereby eliminating the need for precoolers which heretofore have been required.

The conducting of the reaction at the boiling temperature enables the delivery of the slurry to the pelletizing stage while it is still at or very close to the boiling temperature. This results in conservation of heat in the drying process since little or no heat is required to elevate the water to vaporizing temperature. Substantially all that is required is to provide the heat of vaporization.

The present process utilizes low acid concentration during the rock digestion stage, the acid strength (based on acid and water present) preferably being less than 35° Bé. This is in contrast to the conventional practice which requires an acid content of not less than 50° Bé., and higher strengths are commonly used, in order to convert the P₂O₅ to the available form.

By the present process, despite the low acid concentration, an excess of acid is present. In normal superphosphate manufacture, approximately 60 pounds sulfuric acid, 100% basis, is used per 100 pounds of rock, whereas in the present process 100 pounds or more of acid is present per 100 lbs. of rock, but because of the relatively large amount of water present, the actual acid concentration is low. This excess of acid present assures a high degree of conversion of the phosphate rock, and as the reaction is conducted at or near the boiling temperature, the rate of conversion is fast.

An outstanding advantage of the present process is that the final neutralization with ammonia can be conducted rapidly under close control, and anhydrous ammonia can be used, although not limited to the anhydrous form. Thus the final ammoniation can be taken to the point of maximum nitrogen content while maintaining the water soluble fraction of available P₂O₅ at a maximum value. Available phosphoric acid is defined by the Association of Official Agricultural Chemists as "the sum of the water soluble and the citrate-soluble phosphoric acid." The present process permits such close control that 85% or more of the available P₂O₅ is produced in the water soluble form.

I claim:

1. The process of pelletizing phosphate fertilizer that comprises the steps of digesting phosphate rock in an aqueous solution of an inorganic salt and sulfuric acid having an acid concentration not exceeding about 30° Bé. and from about 8% to about 30% of said inorganic salt by weight of the mix and at a temperature of from about 210° F. to about 225° F. until the water content after ammoniation is from about 28% to about 32% by weight of the mix, ammoniating the reaction product until the acids are substantially neutralized and finally pelletizing the ammoniated product at substantially said temperature, the said inorganic salt being one of the group ammonium sulfate, ammonium nitrate, potassium sulfate, potassium nitrate, ammonium biphosphate.

2. The process of making a fluid phosphate fertilizer slurry suitable for pelletizing that comprises the steps of; digesting pulverized phosphate rock in an aqueous solution of ammonium sulfate and sulfuric acid in which the acid concentration of the digestion mix immediately prior to the addition of said rock is from about 18° to about 30° Baumé based on acid and water, agitating said mixture during said digestion, said ammonium sulfate being not less than 8% by weight of the digestion mix and being from about 8% to about 24% by weight of said mix according to the acid concentration and the water content in said solution at the start of the digestion process being greater than 30% by weight of the mix by an amount substantially equal to the difference between said 30% and the amount vaporized during said digestion and final ammoniation of the mix, finally ammoniating said mix to substantially neutralize the free acids and agitating said mix continuously during said ammoniation.

References Cited in the file of this patent

UNITED STATES PATENTS

| | | |
|---|---|---|
| 302,266 | Liebig | July 22, 1884 |
| 1,810,858 | Thorssell et al. | June 16, 1931 |
| 1,849,989 | Moore | Mar. 15, 1932 |
| 1,870,602 | Case | Aug. 9, 1932 |
| 1,871,195 | Ober et al. | Aug. 9, 1932 |
| 2,038,788 | Harvey | Apr. 28, 1936 |
| 2,115,150 | Seyfried | Apr. 26, 1938 |
| 2,136,793 | Gabeler et al. | Nov. 15, 1938 |
| 2,504,545 | Waring et al. | Apr. 18, 1950 |

FOREIGN PATENTS

| | | |
|---|---|---|
| 368,559 | Great Britain | Mar. 10, 1932 |
| 559,482 | Great Britain | Feb. 22, 1944 |